(12) United States Patent
Moore

(10) Patent No.: US 7,724,854 B2
(45) Date of Patent: May 25, 2010

(54) SYNCHRONIZATION METHODOLOGY FOR SYSTEMS EMPLOYING DATA PULL FLOW CONTROL

(75) Inventor: George S. Moore, Veradale, WA (US)

(73) Assignee: Agilent Technologies, Inc., Santa Clara, CA (US)

(*) Notice: Subject to any disclaimer, the term of this patent is extended or adjusted under 35 U.S.C. 154(b) by 1339 days.

(21) Appl. No.: 11/138,508

(22) Filed: May 26, 2005

(65) Prior Publication Data
US 2006/0269026 A1 Nov. 30, 2006

(51) Int. Cl.
*H04L 7/00* (2006.01)
(52) U.S. Cl. ....................................... 375/354
(58) Field of Classification Search ................... 375/354
See application file for complete search history.

(56) References Cited
U.S. PATENT DOCUMENTS 5,774,495 A    6/1998   Noda
5,999,223 A *  12/1999  Patel et al. .................. 348/555
6,067,332 A *  5/2000   Taura et al. .................. 375/344
6,680,727 B2 * 1/2004   Butler et al. ................. 375/144
6,744,834 B1 * 6/2004   Lo .............................. 375/354

OTHER PUBLICATIONS

EP Search Report dated Aug. 9, 2006.

\* cited by examiner

*Primary Examiner*—David C Payne
*Assistant Examiner*—Tanmay K Shah

(57) ABSTRACT

In one embodiment, a system comprises a signal source for generating a digital signal in response to a data pull signal; a digital-to-analog converter (DAC); a first plurality of shift registers for registering digital words of the digital signal before receipt by the DAC; a synchronizing logic element for generating the data pull signal, wherein the synchronizing logic element initially generates the data pull signal to cause the signal source to generate a number of data words, ceases communication of the data pull signal upon receipt of a mark signal, and resumes communication of the data pull signal upon receipt of a trigger signal; and a second plurality of shift registers for registering the mark signal before communication to the synchronizing logic element, wherein the first and second plurality of shift registers are enabled by the data pull signal.

19 Claims, 2 Drawing Sheets

SYNCHRONIZATION METHODOLOGY FOR SYSTEMS EMPLOYING DATA PULL FLOW CONTROL

TECHNICAL FIELD

The present application is generally related to synchronizing a digital system to a trigger signal.

BACKGROUND

In many communication and other systems, it is often necessary to synchronize an output signal according to some timing event. Additionally, the output signal is typically generated using digital logic elements and a suitable digital-to-analog converter. Accordingly, it is then necessary to the synchronize the operation of digital logic elements to the timing event. For example, known systems that conduct cellular communications segment data according to slots, frame, and super-frames. The time between super-frames is referred to as an "epoch." The epoch frequency is a multiple of the communication frequency and the epoch beginning must occur within an error tolerance of a defined GPS time. Accordingly, base stations typically include a clock synchronized to GPS time that generates a trigger signal at the beginning of each epoch to control communications with subscriber devices.

SUMMARY

In one embodiment, digital logic devices are synchronized to an external trigger signal. A digital-to-analog converter (DAC) is used to convert a digital signal generated by a signal source to an analog signal. Also, a first set of shift registers are employed to register data into the DAC. A sync machine is used to control the generation of data by the signal source and communication of the data to the DAC. Specifically, the sync machine communicates "pull" signals that are used to indicate to a prior logic device that new data is to be made available. The pull signals are propagated through a chain of a logic devices to the signal source. As used herein, a "mark" signal refers to a signal that indicates or identifies a digital sample associated with a synchronization or trigger signal. The mark signal is initially provided to the chain of logic devices. The mark signal passes through a second set of shift registers before reaching the sync machine. The receipt of the mark signal indicates to the sync machine that the data corresponding to the time associated with the trigger signal has reached the last register of the first set of shift registers. Accordingly, when the signal reaches the sync machine, the sync machine temporarily ceases communication of the pull signal thereby causing generation of the data to cease. When the trigger signal arrives, the DAC has the correct value to output. The sync machine reasserts the pull signal. The first set of registers shift their values and data words begin to flow into the DAC. Also, the data generation operations are resumed.

DETAILED DESCRIPTION

In some embodiments, data signals are received and transmitted in synchronization with a trigger signal. Digital data is generated to support the transmitted signal and digital signal processing is performed upon the received data signal. To support the received data signal, a "push" data flow control methodology is employed. A "push" signal is asserted to indicate that additional data will be made available upon the next clock cycle. To support the digital operations associated with the transmitted signal, data is communicated according to "data pull" flow control. Specifically, a "pull" signal is asserted upon the retrieval of data to indicate that additional data should be made available upon the next clock cycle.

Figure 1:
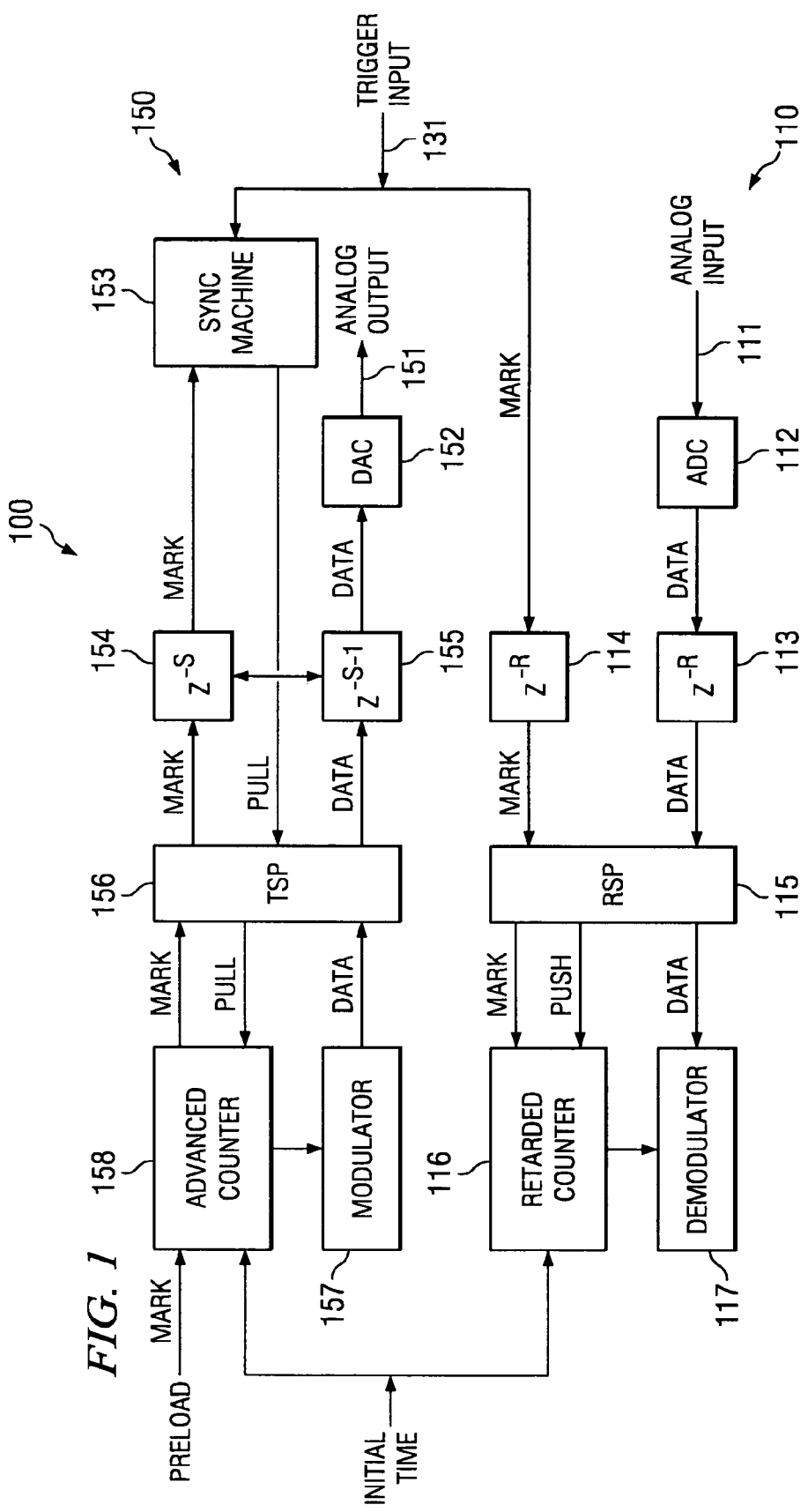
FIG. 1 depicts a block diagram of a system employing timing synchronization according to one representative embodiment.

Referring now to the drawings, FIG. 1 depicts system 100 that includes a plurality of digital logic chains that are synchronized according to one representative embodiment. As shown in FIG. 1, a synchronization trigger signal is received via trigger input 131. System 100 includes receive processing chain 110 that is used to process digital samples of analog input signal 111 according to the trigger signal. System 100 includes transmit processing chain 150 that is used to generate analog output signal 151 which is synchronized to the trigger signal. For example, system 100 may be a CDMA base station emulator. Transmit processing chain 150 may generate the base station signals defined by a suitable CDMA standard (e.g., IS-95, cdma2000, and/or the like). Accordingly, to emulate the operations of a base station, transmit processing chain 150 begins using an appropriate pseudo-noise code or sequence in synchronization to the trigger signal. Receive processing chain 110 may likewise process the CDMA signals from a CDMA subscriber device to verify that the device operates properly.

The trigger signal can be generated internally (generally by a software trigger) or externally. In one embodiment, the trigger signal is used to signal the beginning of a CDMA epoch or any other suitable communication system time reference. The occurrence of the trigger is associated with a time value (denoted by InitialTime in FIG. 1) which is known due to the communication protocol or the application employed by system 100. This time value may be available in a register (not shown) set by software. The time value may be loaded into retarded counter 116 and advanced counter 158 to account for delay within system 100. As indicated by its name, retarded counter 116 provides a timing counter that maintains a time value that is behind the timing of the received trigger signal due to the delay in receiving the data by demodulator 117. Likewise, advanced counter 158 maintains a time value that is ahead of the received trigger signal to enable data to be generated before the receipt of the trigger signal.

When the trigger signal is received, the trigger signal is provided to shift registers 114. The delay provided by shift registers 114 is approximately matched to the pipeline or registering delay (represented by shift registers 113) associated with analog-to-digital converter (ADC) 112. ADC 112 converts analog input 111 to digital samples. By appropriately selecting the delay of shift registers 114, the output of shift registers 114 identifies to receive signal processing (RSP) element 115 which digital sample corresponds to the occurrence of the trigger signal. The output of shift registers 114 that corresponds to the trigger signal is referred to as a "mark" signal. In addition to identifying the digital sample of interest, the mark signal may cause any counters, accumulators, or other similar elements to be reset or preset. RSP element 115 may perform suitable digital signal processing to, for example, translate between the sample rate to the symbol rate or a low multiple thereof. RSP element 115 outputs the processed digital samples to demodulator 117. Additionally, RSP element 115 provides an amount of delay to the mark signal that is approximately equal to the amount of delay associated with the signal processing. After the delay, RSP element 115 outputs the mark signal to retarded counter 116. When retarded counter 116 receives the mark signal, it begins operation at the previous set "InitialTime" value and outputs the value to demodulator 117. Demodulator 117 uses the received time values to perform the desired processing, e.g., recover data from a CDMA signal. For example, depending upon the received time value, demodulator 117 may apply a different bit of a pseudo-noise (PN) sequence.

The operation of receive processing chain 110 occurs in a conventional manner and is relatively straight-forward due to the direction of communication of the digital samples. However, the operation of transmit chain 150 occurs in a different manner. Transmit processing chain 150 must be ready to output analog output 151 upon receipt of the trigger signal. Also, the trigger signal filters "backwards" as pull signals to cause signal processing elements to generate additional data. The problem with transmit processing chain 150 is that the pull signals propagate in a direction that is opposite to the flow of the data samples. Because there are delays between the trigger signal input 131 and modulator 157, the trigger signal cannot be directly used to initiate the processing associated with modulator 157.

Transmit processing chain 150 is initialized using "InitialTime" and "PreLoad" signals. Software preloads the InitialTime value and asserts the PreLoad signal. The PreLoad signal enters advanced counter 159 thereby causing advanced counter 159 to preset to the InitialTime value. Also, advanced counter 158 generates a mark synchronization signal for communication to TSP element 156. The mark signal identifies the digital word to be used to generate the output signal when the trigger signal is received. After delaying the mark signal by an amount equal to its signal processing, TSP element 156 communicates the mark synchronization signal to serially coupled shift registers 154. The synchronization mark is provided from shift registers 154 to sync machine 153.

Figure 2:
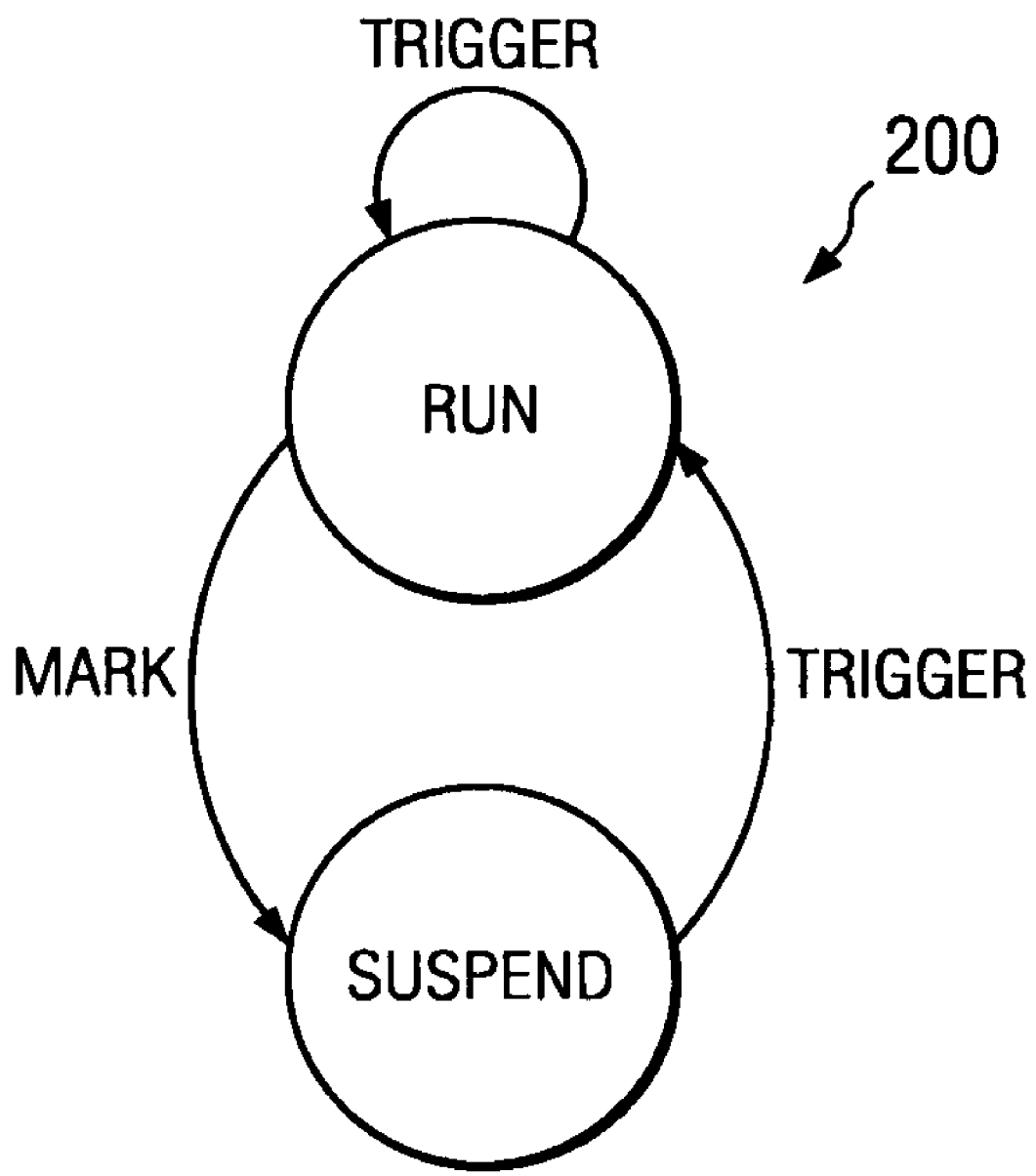
FIG. 2 depicts a state transition diagram according to one representative embodiment.

Additionally, "pull" signals are employed to regulate the flow of data words. A pull signal is a signal communicated to a prior device or logic element in a chain of such devices to indicate that data is being taken and new data should be subsequently provided. FIG. 2 depicts state diagram 200 for implementation of sync machine 153 for generating pull signals according to one representative embodiment. Initially, sync machine 153 operates in a "run" state, i.e., it asserts the pull signal. Sync machine 153 remains in that state until the "mark" signal is received and then suspends assertion of the pull signal. Sync machine 153 returns to the run state and reasserts the pull signal upon receipt of the trigger signal. In addition to causing data to be outputted from TSP element 156, the pull signal from sync machine 153 is also used as the enable signal for shift registers 154 and 155. Registers 155 are used to pipeline data into DAC 152 and are, in practice, typically included within DAC 152.

The pull signal indicates to TSP element 156 that, in the next clock cycle, TSP element 156 is to output a digital word. TSP element 156 employs suitable digital signal processing (e.g., filtering, interpolation, and resampling) to translate from the symbol rate or a low multiple thereof to the system rate at which digital-to-analog converter (DAC) 152 operates. To obtain the lower-rate data, TSP element 156 communicates a pull signal to advanced counter 158 which causes advanced counter 158 to update its timing counter. Modulator 157 generates data words for communication to TSP element 156 according to the timing values provided by advanced counter 158.

After performing the signal processing on the digital words received from modulator 157, TSP element 156 communicates the processed digital words to serially coupled shift registers 155 that are enabled by the pull signal. When the enable signal is applied to shift registers 155, registers 155 output their current values and then set their register value to their respective received values. When the enable signal is not applied, shift registers 155 hold their current value. Shift registers 155 enable a plurality of digital words to be generated for presentation upon the receipt of the trigger signal.

Specifically, during initial operations, sync machine 153 asserts the pull signal and TSP element 156 responds by providing data to the beginning of shift registers 153. Due to the assertion of the pull signal, shift registers 154 and 155 change values. This allows the data words output from TSP element 156 to propagate through registers 155. Also, the mark signal is allowed to propagate through registers 154. There is one unit of delay difference between registers 154 and 155. Accordingly, the mark signal is received by sync machine 153 when the last register 155 receives the data word to be used upon receipt of the trigger signal. When the mark signal is received by sync machine 153, it suspends the assertion of the pull signal. Accordingly, TSP element 156 ceases outputting data words. In response to the suspension of the pull signal, TSP element 156 subsequently ceases providing the pull signal to modulator 157. Modulator 157 likewise suspends its operations when the deassertion of the pull signal progresses through transmit processing chain 150. Also, registers 155 hold their current values upon the deassertion of the pull signal. The last register of registers 155 holds and presents the data word corresponding to the InitialTime value to DAC 152. When the trigger signal arrives, DAC 152 has the correct value to output. Sync machine 153 reasserts the pull signal. Registers 155 shift their values and data words begin to flow into DAC 152. Also, TSP element 156 and modulator 157 resume their operations.

Accordingly, some representative embodiments enable a transmit signal processing chain to be synchronized to an external trigger signal in an efficient manner. Specifically, by using pull signals to regulate data generation and a sync machine to generate the pull signals, some representative embodiments enable the transmit processing chain to be operated ahead of the trigger signal. Hence, data is immediately available when the trigger signal is received. Moreover, the use of pull signals in this manner involves a relatively low amount of circuit complexity and provides a data flow mechanism that is readily shown to be reliable.

In some representative embodiments, the processing performed by TSP element 156 and RSP element 115 may be associated with an otherwise uncompensated amount of delay. For example, group delay associated with the filtering provided by TSP element 156 and RSP element 115 may cause the respective "centers" of the data to diverge from uncompensated mark signals communicated from these elements. Resampling logic devices typically can be operated to provide a temporary change in the resampling operations. The change can be used to introduce a timing adjustment to at least partially address previously introduced group delay.

In some representative embodiments, other timing compensation may be employed. For example, instead of immediately transitioning to a suspend state upon receipt of the mark signal, sync machine 153 may continue to operate for a number of clocks (set by software for the desired compensation). Equivalently, delays could be inserted into the mark chain at the input of the sync machine 153. Alternatively, the InitialTime value can be modified (generally increased) for timing compensation.

What is claimed is:

1. A system, comprising:
   a signal source for generating a digital signal in response to a data pull signal; a digital-to-analog converter (DAC);
   a first plurality of shift registers for registering digital words of said digital signal before receipt by said DAC;
   a synchronizing logic element for generating said data pull signal, wherein said synchronizing logic element initially generates said data pull signal to cause said signal source to generate a number of data words, ceases communication of said data pull signal upon receipt of a mark signal, and resumes communication of said data pull signal upon receipt of a trigger signal; and
   a second plurality of shift registers for registering said mark signal before communication to said synchronizing logic element, wherein said first and second plurality of shift registers are enabled by said data pull signal.

2. The system of claim 1 wherein said signal source comprises: a counter logic element for maintaining a timing value related to generation of said digital signal by said signal source.

3. The system of claim 2 wherein said counter logic element comprises an input for loading an initial time into said counter logic element.

4. The system of claim 3 wherein said mark signal causes said counter logic element to begin counting operations at said initial time.

5. The system of claim 1 wherein said signal source is a modulator.

6. The system of claim 1 wherein said modulator begins utilizing a pseudo-noise sequence upon receipt of said mark signal.

7. A method of operating a circuit including digital logic elements, comprising:
   operating a signal source to generate a digital signal in response to a data pull signal;
   operating a first plurality of shift registers to register digital words of said digital signal before outputting said digital words;
   operating a synchronizing logic element to generate said data pull signal, wherein said synchronizing logic element initially generates said data pull signal to cause said signal source to generate a number of data words, ceases communication of said data pull signal upon receipt of a mark signal, and resumes communication of said data pull signal upon receipt of a trigger signal; and
   operating a second plurality of shift registers to register said mark signal before communication to said synchronizing logic element, wherein said first and second plurality of shift registers are enabled by said data pull signal.

8. The method of claim 7 further comprising: performing digital-to-analog conversion on digital words output from said first plurality of shift registers.

9. The method of claim 7 further comprising: resampling digital words from said signal source before providing said resampled digital words to said first plurality of shift registers; and decimating assertions of said data pull signal before communicating said decimated data pull signal to said signal source.

10. The method of claim 9 further comprising: delaying said mark signal by an amount that corresponds to signal processing delay associated with said resampling.

11. The method of claim 7 further comprising: operating a counter logic element to maintain a timing value related to generation of said digital signal by said signal source.

12. The method of claim 11 wherein said counter logic element comprises an input for loading an initial time into said counter logic element.

13. The method of claim 12 wherein said mark signal causes said counter logic element to begin counting operations at said initial time.

14. The method of claim 7 wherein said signal source is a modulator.

15. The method of claim 7 wherein said modulator begins utilizing a pseudo-noise sequence upon receipt of said mark signal.

16. A system comprising:
   means for generating a digital signal in response to a data pull signal; first means for registering digital words of said digital signal before outputting said digital words;
   means for generating said data pull signal, wherein said means for generating initially generates said data pull signal to cause said signal source to generate a number of data words, ceases communication of said data pull signal upon receipt of a mark signal, and resumes communication of said data pull signal upon receipt of a trigger signal; and
   second means for registering said mark signal before communication to said means for generating said data pull signal, wherein said first and second means for registering are enabled by said data pull signal.

17. The system of claim 16 wherein said first means for registering is integrated within a digital-to-analog converter device that converts digital words output from said first means for registering.

18. The system of claim 16 further comprising: means for resampling digital words of said digital signal from said signal source before communication of said resampled digital words to said first means for registering, wherein said means for resampling decimates assertions of said data pull signal before communicating said decimated data pull signal to said signal source.

19. A system, comprising:
   a signal source configured to generate a digital signal in response to a data pull signal;
   a digital-to-analog converter (DAC);
   first shift registers configured to register digital words of the digital signal before receipt by the DAC;
   a synchronizing logic element configured to generate the data pull signal, wherein the synchronizing logic element initially generates the data pull signal to cause the signal source to generate a number of data words, ceases communication of the data pull signal upon receipt of a mark signal, and resumes communication of the data pull signal upon receipt of a trigger signal;
   second shift registers configured to register the mark signal before communication to the synchronizing logic element, wherein the first and second shift registers are enabled by the data pull signal; and
   a resampling logic element configured to: resample digital words from the signal source before communication of the resampled digital words to the first shift registers; and to decimate assertions of the data pull signal before communicating the decimated data pull signal to the signal source, wherein the resampling logic element delays the mark signal by an amount that corresponds to signal processing delay associated with the resampling.

* * * * *